H. ARDEN.
CAR-ELEVATOR.
No. 7,042. Reissued April 11, 1876.
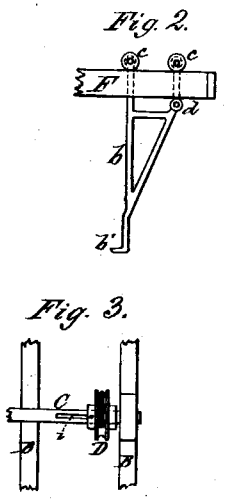
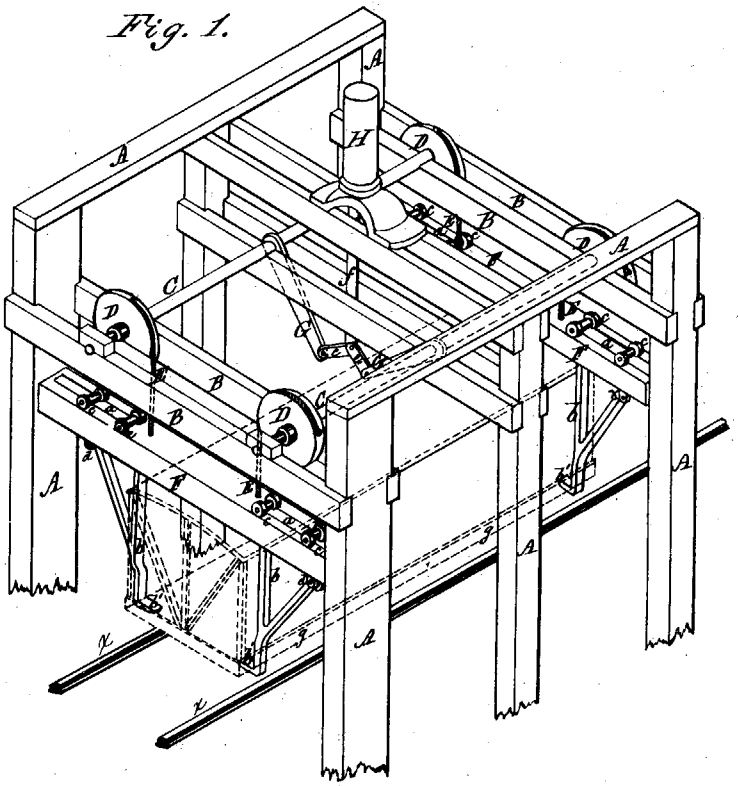
*Witnesses,*
Chas. E. Emery,
C. Augustobler
*Inventor,*
Henry Arden
N. PETERS, PHOTO-LITHOGRAPHER, WASHINGTON, D. C.

UNITED STATES PATENT OFFICE

HENRY ARDEN, OF BROOKLYN, NEW YORK.

IMPROVEMENT IN CAR-ELEVATORS.

Specification forming part of Letters Patent No. 77,706, dated May 5, 1868; reissue No. 7,042, dated April 11, 1876; application filed March 25, 1876.

*To all whom it may concern:*

Be it known that I, HENRY ARDEN, of Brooklyn, Kings county, New York, formerly of Cincinnati, Hamilton county, and State of Ohio, have invented a new and useful Car-Body Elevator; and I do hereby declare that the following is a full, clear, and exact description of the same, reference being had to the accompanying drawings, making part of this specification.

This invention has for its object to provide means for raising and lowering the bodies of cars in a safe, convenient, and expeditious manner, more particularly for lifting railroad-cars so that they will become disconnected from their trucks, and thus permit latter to be moved away, if desired, and others substituted.

As distinguished from apparatus previously used for lifting car-bodies—for instance, by applying several jacks to different parts of a car, each operated independently of the others, and therefore depending upon the discretion and attention of the operators to secure uniformity of action, and prevent straining the car-body, and often one or more of the jacks—this invention provides apparatus to lift the car-body bodily, so to speak, or all parts of the same, substantially at the same time and to the same extent, and to lower the body upon the tracks in the same manner.

The apparatus is useful for elevating car-bodies to adjust the springs or to remove the trucks for repairs, but is specially applicable for locations where connecting railroads are of different gages, so that it is desired to change trucks and permit the car proper with its load to continue the journey without breaking bulk.

The invention consists, first, of a number of lifters, provided with lifting-surfaces so connected that they may be operated simultaneously to raise and lower a car-body, and permit a change of the trucks; second, in an apparatus for lifting a car-body bodily, of lifting-surfaces made adjustable laterally in respect to the tracks, whereby said lifting surfaces may be kept out of the way when shifting the car on the tracks in and out of position, and be adjusted to engage with cars of different widths; third, in an apparatus for lifting a car-body bodily, of lifting-surfaces made adjustable in relation to each other, in the general direction of the length of the car, so that the lifting forces may be applied to suitable portions of cars of different length; fourth, of the combination of a beam with a pair of car-lifters, to aid in securing certainty and uniformity of action of the two lifters; fifth, of the combination of a first mover connected to a steam or hydraulic engine, or equivalent motor, with a number of car-body lifters in such manner as to operate the same simultaneously, and thereby lift all parts of the car without unduly straining any portion; sixth, of simultaneously-operated car-lifters, arranged at the sides of railroad-tracks, combined with guides for securing vertical motion of the same, and lifting-surfaces for transferring such motion to a car-body without interference with the removal of the trucks; seventh, of transmitting levers combined with simultaneously-operated car-lifters and a first mover, to positively connect the said parts and secure the said simultaneous action of the lifters; lastly, of various mechanical details for carrying into effect the several operations in manner referred to.

Some of the principal features of the invention, and of the operation of the same, can be understood without necessarily referring to the particular construction shown in the drawing, and may be described as follows: A location for the apparatus is selected on railroad-tracks connected with the general system, and at the sides of the tracks are arranged a number of lifters—four are preferred—suitably guided to move vertically. Supported by the lifters are lifting-surfaces arranged to catch under the car-body, near the ends thereof, at points most suitable for supporting the weight. The lifters are preferably arranged so that the lifting-surfaces can be adjusted laterally, and thereby kept back out of the way when shifting the car in and out of position on the tracks, and be readily adjusted for car-bodies of different widths.

The several lifters are operated simultaneously, to raise or lower the car-body by connection to one first mover so that the four corners of the car are lifted simultaneously, whether the car-load be distributed uniformly or not.

In the drawings, Figure 1 is a perspective view of a machine showing one way of carrying into effect the several features of the invention. Fig. 2 is a side view of one of the transverse beams with lifters attached. Fig. 3 is a top view of the end of one of the shafts through which the motion of the operating levers is transmitted, and shows the method of obtaining longitudinal adjustment.

In this particular form of the apparatus it is provided to lift the car-bodies from above by lifters *b*, operated by machinery supported by suitable frame-work, consisting substantially of timbers B B, carried across above the tracks, and supported by vertical framing A, on either side of the tracks. The lifters *b*, at the ends of the apparatus, are attached to cross-beams F F, in a manner hereinafter described, to permit the lateral adjustment mentioned, and the lifting force is applied simultaneously to the two cross-beams from one first mover, *f*, which general arrangement of beams and lifters is applicable independent of the means of operating the two beams simultaneously, which is provided for in the apparatus shown in the following manner: In suitable bearings upon the cross-timbers B B are supported longitudinal shafts C C, and secured near the centers of the shafts are levers G G, the outer ends of which are connected to a first mover, *f*, by links *e e*. This first mover *f* may be attached to a steam or hydraulic engine, capstan, or levers, or any suitable apparatus or machinery which will give it the required motion and power. In the drawing the first mover *f* is represented as the piston-rod of a steam or hydraulic engine, the cylinder of which is, in the particular arrangement, supported, as shown, upon suitable cross-timbers connected with side framing A. Near the ends of the shafts C C, and secured to turn therewith, are pulleys D D, which carry ropes or chains E, the upper ends of which are attached to the pulleys, and the lower ends to the beams F. The pulleys D, at one end of each shaft, are keyed thereon rigidly, while at the other end they are so secured as to allow them to be moved at will longitudinally on said shafts, while, by means of the grooves or splines in them, as seen in Fig. 3, at *i*, and corresponding keys in the eyes of the pulleys, which keys work in said splines, they are forced to revolve with their respective shafts.

This longitudinal movement may often be necessary, in order to place the cross-beams F and the lifters *b* at any desired distance apart to suit cars of different lengths. The beams F are provided with long mortises *a*, in which are suspended the lifters *b*, as seen in Figs. 1 and 2. To each lifter is attached two rollers or wheels, *c*, which rest on one of the beams F. Each lifter is also provided with a roller or wheel, *d*, under the beam, to prevent the lower end from swinging outward, and also to allow the lifters to be moved back and forth on the beams F more easily than they could be if suspended on single rollers.

The form of the lifters *b* is plainly shown in Fig. 2, in which it will be observed that the lifting-surface *b'* is formed on a lug projected inward from the lifter.

It would be possible in some cases to make the lifting-surface *b'* of such length as to engage more or less with cars of different widths without lateral adjustment, but such adjustment is preferred.

The operation of the machine is as follows: A car being run on the tracks between the lifters *b*, when the same are separated and lowered said lifters are pushed in against the car, or until the lifting-surfaces *b'* will engage with the lower part of car, as desired, when, motion being imparted by any suitable means to first mover *f*, the same, through links *e*, will move the levers G, and they, through the shafts C C, turn pulleys D, which, through the ropes or chains E, will lift beams F, lifters *b*, and lifting-surfaces *b'*, which latter will lift the car-body. When the body is lifted clear of the trucks, the latter may be rolled away, and others, if desired, placed in their stead, or the car-body lowered upon blocking, or upon any carriage in place of the trucks—a flat car, for instance.

In the drawing a car-body is shown in dotted lines suspended by the apparatus, with trucks removed.

In lowering, the operations above described are simply reversed.

Since the pulleys D make but a portion of a revolution, the same are, in effect, levers equal in length to the radii of the wheels, and the lifters F, with or without intermediate beams E, are operated from the first mover *f* by levers, of which the arms are G G, and the radii of the pulleys D D.

It will be observed that the cross-beams F are arranged between vertical posts in the side framing A, which posts, therefore, act as guides for the beams F and their attached lifters. With this arrangement the liability, which occurs in using common jacks, of their capsizing and dropping the car-body, or of simply shifting the body laterally as it is raised or lowered, is avoided, since the guides provided for the lifters insure the return of the car-body to its original position, so that the connections of the body and truck will coincide laterally, and the truck may be adjusted readily longitudinally by shifting the same on the tracks.

What I claim as my invention, and desire to secure by Letters Patent, is—

1. In a car-elevator, a number of lifters, provided with lifting-surfaces, so connected that they may be operated simultaneously to raise and lower a car-body, and permit a change of the trucks, substantially as and for the purposes specified.

2. In an apparatus for lifting a car-body bodily, lifting-surfaces adjustable at right angles to the general direction of the tracks, substantially as and for the purposes specified.

3. In an apparatus for lifting a car-body bodily, lifting-surfaces made adjustable, in relation to each other, in the general direction of the length of the car, substantially as and for the purposes specified.

4. The combination of a beam with a pair of car-lifters, substantially as and for the purposes specified.

5. The combination of the first mover, connected to a steam or hydraulic engine or equivalent motor, with a number of car-body lifters in such manner as to operate the lifters simultaneously, substantially as and for the purposes specified.

6. Simultaneously-operated car-lifters, arranged at the side of railroad-tracks, combined with guides for securing vertical motion of the same and lifting-surfaces, for transferring such motion to a car-body without interference with the removal of the trucks, substantially as and for the purposes specified.

7. Transmitting-levers, combined with simultaneously-operated car-lifters and a first mover, substantially as and for the purposes specified.

8. The combination of the frame A, shafts C, and arms G with the links *e* and rod *f*, substantially as and for the purpose set forth.

9. The shafts C and pulleys D, in combination with the ropes or chains E and beams F, all as shown and described.

10. The combination of the beams F and lifters *b*, all as shown and described.

11. The combination of the arms G, shafts C, and pulleys D, all as shown and described, and for the purpose specified.

12. The combination of the shafts C, pulleys D, and ropes or chains E, all as shown and described, and for the purpose specified.

HENRY ARDEN.

Witnesses:
CHAS. E. EMERY,
E. HUGENTOBLE.